(12) United States Patent
Junker

(10) Patent No.: US 10,954,905 B2
(45) Date of Patent: Mar. 23, 2021

(54) INTERNAL COMBUSTION ENGINE COMPRISING A FUEL INJECTION NOZZLE WITH AN ADDITIONAL SUPPLY OF A COMBUSTION-PROMOTING MEDIUM INTO THE COMBUSTION CHAMBER

(71) Applicant: ERWIN JUNKER GRINDING TECHNOLOGY A.S., Melnik (CZ)

(72) Inventor: Erwin Junker, Buehl/Baden (DE)

(73) Assignee: ERWIN JUNKER GRINDING TECHNOLOGY A.S., Melnik (CZ)

( * ) Notice: Subject to any disclaimer, the term of this patent is extended or adjusted under 35 U.S.C. 154(b) by 0 days.

(21) Appl. No.: 16/480,369

(22) PCT Filed: Jan. 24, 2018

(86) PCT No.: PCT/EP2018/051683
§ 371 (c)(1),
(2) Date: Jul. 24, 2019

(87) PCT Pub. No.: WO2018/138126
PCT Pub. Date: Aug. 2, 2018

(65) Prior Publication Data
US 2019/0353124 A1    Nov. 21, 2019

(30) Foreign Application Priority Data

Jan. 26, 2017 (DE) ...................... 10 2017 201 275.7

(51) Int. Cl.
*F02D 41/00* (2006.01)
*F02M 43/04* (2006.01)
(Continued)

(52) U.S. Cl.
CPC ......... *F02M 43/04* (2013.01); *F02D 19/0694* (2013.01); *F02M 61/1886* (2013.01); *F02M 67/02* (2013.01); *F02M 67/12* (2013.01)

(58) Field of Classification Search
CPC .. F02D 41/0032; F02D 41/0042; F02M 25/08
(Continued)

(56) References Cited

U.S. PATENT DOCUMENTS 4,106,448 A * 8/1978 Noguchi ................. F02D 41/24
123/268
5,115,774 A   5/1992 Nomura et al.
(Continued)

FOREIGN PATENT DOCUMENTS

DE    3906312 C1    12/1989
DE    3936966 A1    8/1990
(Continued)

OTHER PUBLICATIONS

International Search Report for PCT/EP2018/051683, dated Mar. 15, 2018.

*Primary Examiner* — John Kwon
(74) *Attorney, Agent, or Firm* — Marshall, Gerstein & Borun LLP

(57) ABSTRACT

A reciprocating piston-type internal combustion engine includes a cylinder head that has an inlet valve that can be supplied with combustion air from a cylinder inlet line connected to the inlet valve, comprising a pressure accumulator, out of which an additional medium that promotes the combustion in the cylinder can be supplied to the cylinder in a controlled manner, and an injection nozzle, via which fuel can be injected into the cylinder. The additional medium is a combustion air/fuel mixture according to the invention. The pressure accumulator is connected to the injection nozzle which has a nozzle needle, and the additional medium can be introduced into the cylinder in a controlled manner by means of the injection nozzle.

4 Claims, 5 Drawing Sheets

(51) Int. Cl.
*F02D 19/06* (2006.01)
*F02M 61/18* (2006.01)
*F02M 67/02* (2006.01)
*F02M 67/12* (2006.01)

(58) Field of Classification Search
USPC ....... 123/288, 434, 698, 699, 700, 437, 445, 123/490; 12/179.7, 179.16, 179.17
See application file for complete search history.

(56) References Cited

U.S. PATENT DOCUMENTS

| | | | |
|---|---|---|---|
| 6,532,937 B1* | 3/2003 | Boecking | F02M 63/00 |
| | | | 123/445 |
| 2004/0103875 A1* | 6/2004 | Simon | F02B 75/10 |
| | | | 123/300 |
| 2012/0111306 A1* | 5/2012 | Cheiky | F02M 69/18 |
| | | | 123/445 |
| 2014/0083397 A1 | 3/2014 | Huettner et al. | |
| 2015/0040848 A1* | 2/2015 | McAlister | F02B 47/04 |
| | | | 123/1 A |
| 2015/0292441 A1* | 10/2015 | Peters | F02M 21/029 |
| | | | 123/445 |
| 2020/0116094 A1* | 4/2020 | Ge | F01N 3/208 |

FOREIGN PATENT DOCUMENTS

| | | |
|---|---|---|
| DE | 3936986 A1 | 5/1991 |
| DE | 69100803 T2 | 4/1994 |
| DE | 102004047975 A1 | 4/2006 |
| DE | 102005014644 A1 | 10/2006 |
| DE | 10224719 B4 | 3/2007 |
| DE | 112007000944 T5 | 2/2009 |
| DE | 102008000324 A1 | 8/2009 |
| DE | 102008000326 A1 | 8/2009 |
| DE | 102010033591 A1 | 4/2011 |
| DE | 102012014205 B3 | 2/2014 |
| DE | 102013014329 A1 | 2/2015 |
| DE | 102014002905 A1 | 4/2015 |
| DE | 102012014204 B4 | 3/2016 |
| JP | 2008138609 A | 6/2008 |

* cited by examiner

INTERNAL COMBUSTION ENGINE COMPRISING A FUEL INJECTION NOZZLE WITH AN ADDITIONAL SUPPLY OF A COMBUSTION-PROMOTING MEDIUM INTO THE COMBUSTION CHAMBER

CROSS-REFERENCE TO RELATED APPLICATION

This is the United States national phase of International Patent Application No. PCT/EP2018/051683 filed Jan. 24, 2018, which claims priority to DE 10 2017 201 275.7 filed Jan. 26, 2017, the entire contents of each of which hereby incorporated by reference.

FIELD OF THE DISCLOSURE

The invention relates to a reciprocating piston-type internal combustion engine, and to a method for introducing a combustion-promoting medium into the combustion chamber.

BACKGROUND

Reciprocating piston-type internal combustion engines are known in which the combustion air required for combustion is supplied to the cylinder via an intake valve in the cylinder head of a cylinder, wherein the intake valve is arranged at the end of an inlet line via which the entirety of the combustion air, including the scavenging air, can be supplied to the cylinder. In conventional constructions, internal combustion engines have an injection nozzle, which has a nozzle needle in its interior, which controls the fuel supply into the cylinder. It is also known to additionally provide a compressed air reservoir out of which additional combustion air is introduced into the cylinder via the intake valve arranged in the cylinder head, for controlling and/or increasing the torque of the internal combustion engine as well as for controlling and improving the cold start behavior of such internal combustion engines. This additional combustion air is realized either directly via the air intake valve in the cylinder head or via an additional air intake valve.

As such, DE 11 2007 000 944 T5 describes an internal combustion engine in which additionally a compressed air tank is provided at a very high pressure of approximately 200 bar, out of which an injection of additional combustion air during the compression stroke, in particular during the beginning of the compression stroke, is realized. Although it is thus possible to have a positive influence on emissions—and in multi-cylinder engines, especially on the overall performance of the internal combustion engine—for such high pressures in the pressure vessel, however, a significant amount of additional energy is required. This is particularly because accordingly large amounts of air must be retained at such high pressures, and must be conveyed into the cylinders in rapid cycles with speeds corresponding to the rotational speed of the internal combustion engine.

DE 10 2010 033 591 A1 describes an internal combustion engine with improved cold start behavior. Additionally-compressed pressurized air from an air reservoir is supplied to the cylinder immediately before the actual ignition process, after a fuel-air mixture has already been compressed in the cylinder. For this as well, relatively high pressures must be maintained in the compressed air tank. DE 10 2004 047 975 A1 discloses the synchronized supply of additional combustion air to the cylinder in the form of compressed air out of a pressure accumulator during the intake phase. The compressed air tank which is already present as part of a compressed air brake system is used as the pressure vessel. The synchronized injection of additional air can be used, with an appropriate adjustment of quantity and injection duration, to influence the operating parameters of the internal combustion engine in terms of overall performance. In this system as well, the additional air is supplied to the intake passage—specifically, during the intake phase. As a result, a relatively large amount of air from the pressure vessel must be made available for each injection cycle each time.

Further such systems with an additional compressed air tank are known from DE 10 2012 014 204 B4, and from DE 10 2012 014 205 B3. For these internal combustion engines, additional combustion air can be supplied from a pressure vessel to two divided intake manifolds by means of a controllable blocking element. In DE 10 2008 00 326 A1, for a known internal combustion engine, an additional device for blowing additional compressed air is provided between a turbocharger and the intake valve of the internal combustion engine, likewise in the air intake tract. In this case, the compressed air is not permanently introduced into the intake tract—rather, only if this makes sense depending on the current operating situation of the vehicle in terms of safety, ride comfort and wear.

The other known systems according to DE 102 247 19 B4, DE 39 063 12 C1 and DE 2008 000 324 A1 have in common that an additional pressure vessel is recommended at various points of the intake system in turbocharged engines as well as in naturally aspirated engines.

A disadvantage of these known internal combustion engines having a pressure accumulator, which also feeds additional combustion air into the intake passage of the internal combustion engine, is the relatively large complexity of equipment, and, because of the large cross sections in the intake system, also the relatively large amounts of air which must be conveyed so that at least a certain fraction of additional combustion air enters the cylinder.

The invention proceeds from a reciprocating piston-type internal combustion engine as described in DE 691 00 803 T2. This engine has an intake valve arranged in a cylinder head of a cylinder, via which combustion air can be supplied to the cylinder from an intake passage connected to the intake valve, and has a pressure accumulator out of which an additional medium which promotes combustion in the cylinder is supplied in a controlled manner. The fuel in this case is injectable in a controlled manner by means of an injection nozzle in the cylinder, wherein the pressure accumulator is connected to the injection nozzle having a nozzle needle.

Various designs for suitable injection nozzles are described, for example, in the publications DE 39 36 986 A1, DE 10 2013 014 329 A1 and DE 10 2014 002 905 A1.

GENERAL DESCRIPTION

In light of the foregoing, the object of the present invention is both to keep the amounts of gaseous or liquid medium which must be additionally introduced into the cylinder and which promote combustion controllable, and also to reduce them, while still ensuring a reliable improvement in the operating performance of the internal combustion engine, and additionally keeping the complexity of the construction and the equipment used to control the supply of the medium into the cylinder of an internal combustion engine as simple as possible. Furthermore, it is an object of the invention to optimize engine performance with improved exhaust gas values.

According to a first aspect of the invention, the reciprocating piston-type internal combustion engine has an intake valve disposed in a cylinder head of a cylinder, to which combustion air to be introduced from an intake passage into the cylinder, or additionally a combustion gas/fuel, or a combustion air/combustion gas/fuel mixture, is supplied, and which, with a corresponding valve control, supplies the combustion air, the combustion gas, or the mixture to the cylinder in a clocked manner. In addition, the internal combustion engine has a pressure accumulator out of which an additional medium used to promote the combustion in the cylinder, and optionally the mixture formation in the cylinder, can be supplied to the cylinder in a controlled manner. The internal combustion engine also has an injection nozzle in the cylinder head, via which fuel can be injected into the cylinder, wherein the fuel is correspondingly atomized by means of the injection nozzle in order to be able to realize an optimum combustion behavior. According to the invention, the pressure accumulator is connected to the injector nozzle having a nozzle needle, wherein the additional medium to be introduced into the cylinder can be conveyed from the pressure vessel into the cylinder in a controlled manner by means of the nozzle needle. For conventional internal combustion engines with conventional injection systems, injection nozzles are used which have a nozzle needle in their interior, which ensure, by appropriate stroke, cross-sections for injecting the pressurized fuel.

According to the invention, for the internal combustion engine according to the invention, now the conventional injection nozzle is additionally designed such that the additional medium is likewise introduced into the cylinder via the injection nozzle. Such an injection nozzle according to the invention therefore has a dual function because it realizes the injection of the fuel and the atomization of the fuel, both known per se, but at least partially simultaneously also enables the supply of additional medium out of an additional pressure accumulator, such that no further organs are required to introduce this additional medium so as to improve the combustion in the cylinder. Since relatively good controllability is ensured in the injection nozzle, the handling and conveying of large volumes—as required when an additional supply of medium via the large-volume intake passages must be achieved—can be largely dispensed with in the internal combustion engine according to the invention, without the need to dispense with the desired function, namely the operating behavior, the torque, and the cold start behavior, in the internal combustion engines of the invention. These can be precisely controlled in the solution according to the invention.

Preferably, in the internal combustion engine according to the invention, the stroke of the nozzle needle is controlled, preferably fuel pressure-controlled, in such a manner that, when a defined injection pressure is reached in the interior of the injection nozzle, a sealing seat is opened by the nozzle needle lifting off of the sealing seat, such that fuel and/or the medium can be introduced into the cylinder by passing the sealing seat. According to the invention, the medium supplied via the injection nozzle is now introduced in such a way that the additional medium is introduced into the cylinder via this sealing seat simultaneously, or with a time delay, or partially simultaneously, with appropriate attention to the pressure conditions in the injection nozzle and the spring forces acting on the nozzle needle. The lifting movement of the nozzle needle can also be produced with piezo elements, or a solenoid coil, or hydraulically in the case of large engines.

Preferably, the nozzle needle has in its interior a medium channel via which the additional medium can be introduced into the cylinder. This medium channel can be sealed and closed against the aforementioned sealing seat, and/or opened when the nozzle needle lifts off the same. However, it is also possible that an additional valve is arranged preferably on the pressure accumulator or on the injection valve, or between the pressure accumulator and the injection valve, and controls the supply of the additional medium to the cylinder by means of a control device. In this case, the amount of medium, as well as the volume flow thereof to the cylinder, are preferably controlled by controlling this valve according to the fuel injection process—in particular, as a function of the fuel injection volume. Controlling the supply of the additional medium according to the fuel injection process makes it possible to ensure that the additional medium is introduced into the cylinder only towards the end of the injection process of the fuel, by way of example, such that the pressures in the injection nozzle are already reduced at this point to such an extent that, although the nozzle needle is still open, there is no backflow of the pressurized fuel into the medium channel. In addition, preferably an additional mechanism also still holds the nozzle needle on the sealing seat, although the fuel pressure which usually ensures the lifting of the nozzle needle in the injection nozzle housing is already degraded at this point to such an extent that, under normal circumstances, the spring pressure loading the nozzle needle would result in its closing.

The medium additionally introduced to promote combustion in the cylinder is preferably gaseous, and more preferably is compressed air. Oxygen is also possible. However, it is also possible that a combustion gas which has an additional calorific value, and which additionally releases energy during the combustion process in the cylinder, is used as the medium. It is also preferred that a combustion air/combustion gas mixture is used as an additional medium, such that it is possible to directly influence the operating performance of the engine via the fractions of these two components of the mixture. According to a further embodiment, it is also possible that the additional medium is liquid, wherein the medium is preferably liquid in the pressure accumulator and the medium channel up to the injection or introduction into the cylinder of the engine, where due to the pressure and temperature conditions a transition into a gaseous phase can occur—possibly immediately. Preferably, the liquid medium is water, the atomizing effect of which is commonly known in the cylinder when it is injected separately or when it is injected as a water/fuel emulsion. A supply of the medium in the form of water vapor is also possible.

Preferably, the medium supply through the housing of the injection nozzle to the nozzle needle arranged in the interior of the injection nozzle is implemented though a transverse bore which can be opened and/or closed via the stroke of the nozzle needle. It is also possible that a groove is provided which runs around the radial periphery of the nozzle needle and/or the housing of the injection nozzle, with the same width as the associated bore, such that, even if the nozzle needle rotates during operation, a supply of medium to the central medium channel is always ensured via the radial medium channels.

Preferably, the injection nozzle is a multi-hole nozzle with a blind hole. However, it can also preferably be an injection nozzle in the form of a throttle pin nozzle. The formation of an injection nozzle as a multi-hole nozzle with a blind hole can be realized with the normal size or with a reduced blind hole size. The basic structure of such blind-hole nozzles is known per se and is characterized in that the nozzle needle has a conical design in its frontal region, which realizes a sealing effect above the blind hole in the interior of the injection nozzle housing when no fuel is exerting pressure on a shoulder above the same, thereby lifting the nozzle needle off of the sealing seat. The conical point of the nozzle needle therefore seals off the fuel pressure chamber from the blind hole, from which a plurality of injection bores leads in the radial direction to the interior of the cylinder. In contrast, a throttle pin nozzle is a so-called single-hole nozzle with a pin on the nozzle needle that dips into the orifice of the nozzle body. The advantage of such throttle pin nozzles is that a certain self-cleaning of the nozzle opening is effected.

Further preferably, a medium passage is provided between the pressure accumulator and directly at the connection to the injection nozzle housing, via which the additional medium is conveyed to the injection nozzle and thus into the cylinder via the injection nozzle. The diameter of the medium passage is designed so that it corresponds at least to the maximum stroke of the nozzle needle. This ensures that with each stroke of the nozzle needle, additional medium is applied to the medium channel arranged in the interior of the nozzle needle.

The essential advantages of the internal combustion engine according to the invention, having an injection nozzle via which additional medium is injected, in addition to the conventional injection of fuel, is that an improved control behavior of the internal combustion engine at different operating conditions is possible without requiring great additional complexity in terms of construction and equipment. Furthermore, a significant increase in performance is possible with the same displacement.

This influence does not only enable achieving a performance increase in the engine. In addition, the targeted influence on the operating behavior of the engine also enables, to a great degree, achieving an exhaust gas optimization.

According to a second aspect of the invention, the method comprises introducing into the cylinder of this internal combustion engine an additional medium, which promotes the combustion, and optionally also the mixture formation, in a cylinder of an internal combustion engine. According to the method according to the invention, the medium is supplied via an injection nozzle which is present in any case in the cylinder head of a reciprocating piston-type engine, and which is specially adapted for this method according to the invention.

Preferably, the supply of the medium takes place at least partially simultaneously with the fuel. However, it is also possible that the supply of the medium is decoupled from the fuel, such that the high pressures present in the supply of the fuel are not required for the medium to be introduced into the cylinder.

According to a preferred embodiment, the supply of the medium is valve-controlled, independently of the lifting movement of the nozzle needle. This means that in a medium channel from the pressure accumulator to the injection nozzle, a valve is arranged which is controlled by a control device, such that the amount of additional medium into the cylinder is controlled. According to an alternative variant, the introduction of the additional medium is stroke-controlled during the fuel injection. Also preferably, the additional medium is a gaseous fuel which is introduced either alone or in the form of a combustion air/fuel mixture into the cylinder as an additional medium. According to a development of the method according to the invention, it is also possible that, in the simplest case, the additional medium is compressed air. The compressed air additionally introduced into the cylinder via the injection nozzle ensures that an additional supply of oxygen is furnished for the combustion taking place in the cylinder.

Furthermore, it is also possible that gaseous fuel and gases from the exhaust gas recirculation are used as the mixture.

BRIEF DESCRIPTION OF THE DRAWINGS

Further advantages, details and embodiments of the invention will now be described in detail with reference to the embodiment explained below in the drawings. In the drawings.

DETAILED DESCRIPTION

Figure 1:
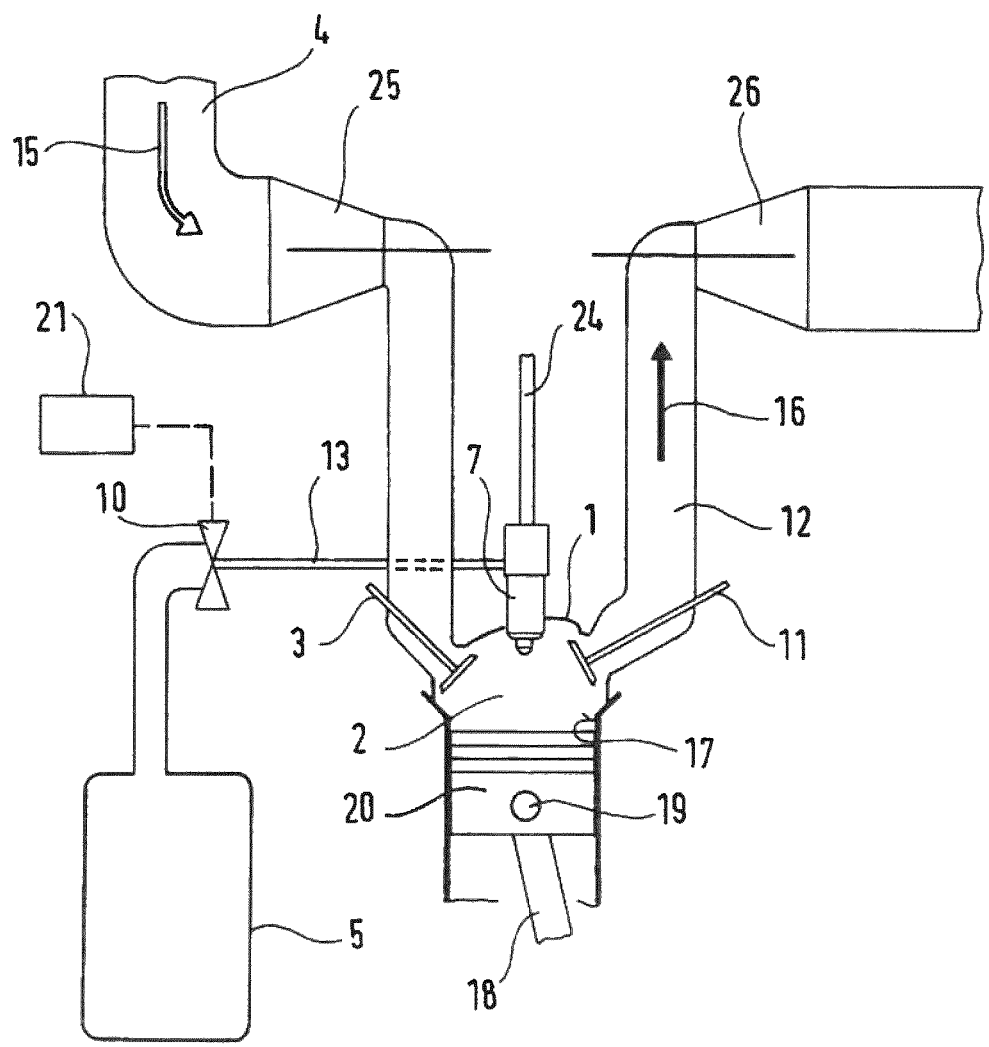
FIG. 1 shows a schematic view of a cylinder of a reciprocating piston-type engine having an intake passage, an exhaust pipe, and pressure vessel connected to the injection nozzle for a medium for promoting combustion in the cylinder.

FIG. 1 is a schematic view of a cylinder 2 of a reciprocating piston-type engine with an intake valve 3 and an exhaust valve 11 mounted in the cylinder head 1. Via a charge air line 4 and/or an intake passage, inlet air 15 is passed through a compressor 25 to increase the boost pressure, and from there to the intake valve 3 and, if the intake valve 3 is open, is guided into the cylinder 2. When the exhaust valve 11 is open, burnt gas 16 flows after combustion through the exhaust valve 11 into the exhaust pipe 12, and from there through the exhaust gas turbine 26 where energy is extracted from the exhaust gas 16 to drive the compressor 25 arranged in the intake passage 4.

In addition, an injection nozzle 7, via which fuel is injected into the cylinder for combustion via a fuel line 24, is arranged in the cylinder head 1. A medium line 13 for a gaseous or liquid medium is connected to the injection nozzle 7, the medium being introduced via the injection nozzle 7, specifically via the interior of the injection nozzle 7 through the nozzle needle 6, into the cylinder 2 to promote the combustion. The gaseous or liquid medium may be combustion air, the oxygen content of which contributes to improved combustion, or a combustion gas that ignites and burns solely at the temperatures created by the compression in the cylinder 2 as the piston 20 moves toward top dead center, such that additional energy is provided for the power stroke of the piston 20 of the internal combustion engine. The work resulting from the combustion is forwarded via the piston 20, the crankpin 19, and the connecting rod 18 to drive the crankshaft, which is not shown in FIG. 1.

A pressure accumulator 5 for the medium is connected to the medium line 13 and thus to the injection nozzle 7. Between the pressure accumulator 5 and the injection nozzle 7, a valve 10 is arranged via which the amount of pressurized medium is supplied via the injection nozzle 7 to the cylinder 2 for improved combustion. This valve 10 is controlled via a control device 21 to control the amount of medium passed through it. The control is carried out according to desired and/or monitored engine parameters, such as cold start behavior, performance, emissions, etc.

Figure 2:
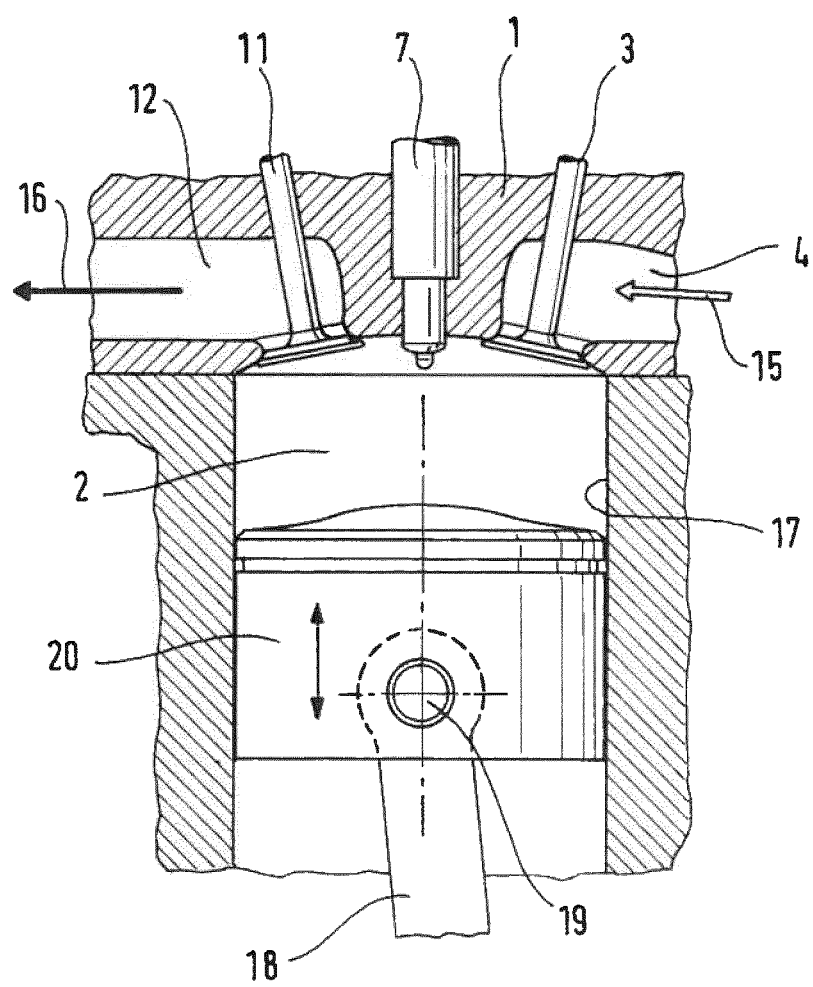
FIG. 2 shows a sectional view through the cylinder of a reciprocating piston-type engine having an intake valve, exhaust valve and injection nozzle.

FIG. 2 shows a cross-section through a reciprocating cylinder. The cylinder 2 has a cylinder head 1, in which an intake valve 3, an outlet valve 11, and an injection nozzle 7 are arranged. Intake air 15 flows via an intake passage 4 to the intake valve 3 and, upon its opening during the purging and/or intake stroke, into the cylinder 2. In the cylinder 2, a piston 20 is guided in the cylinder liner 17, and is connected via a crankpin 19 and the connecting rod 18 to a crankshaft, which is not shown. An exhaust valve 11 is also arranged in the cylinder head 1, which in the opened state passes burnt gas resulting from the combustion process in the cylinder 2 into the exhaust pipe 12 as exhaust gas 16, which is conveyed in its further course—for example, to an optionally present exhaust gas turbine 26 (see FIG. 1). FIG. 2 shows the basic structure of such a cylinder 2, without the connection line for the pressurized medium on the injection nozzle 7.

Figure 3:
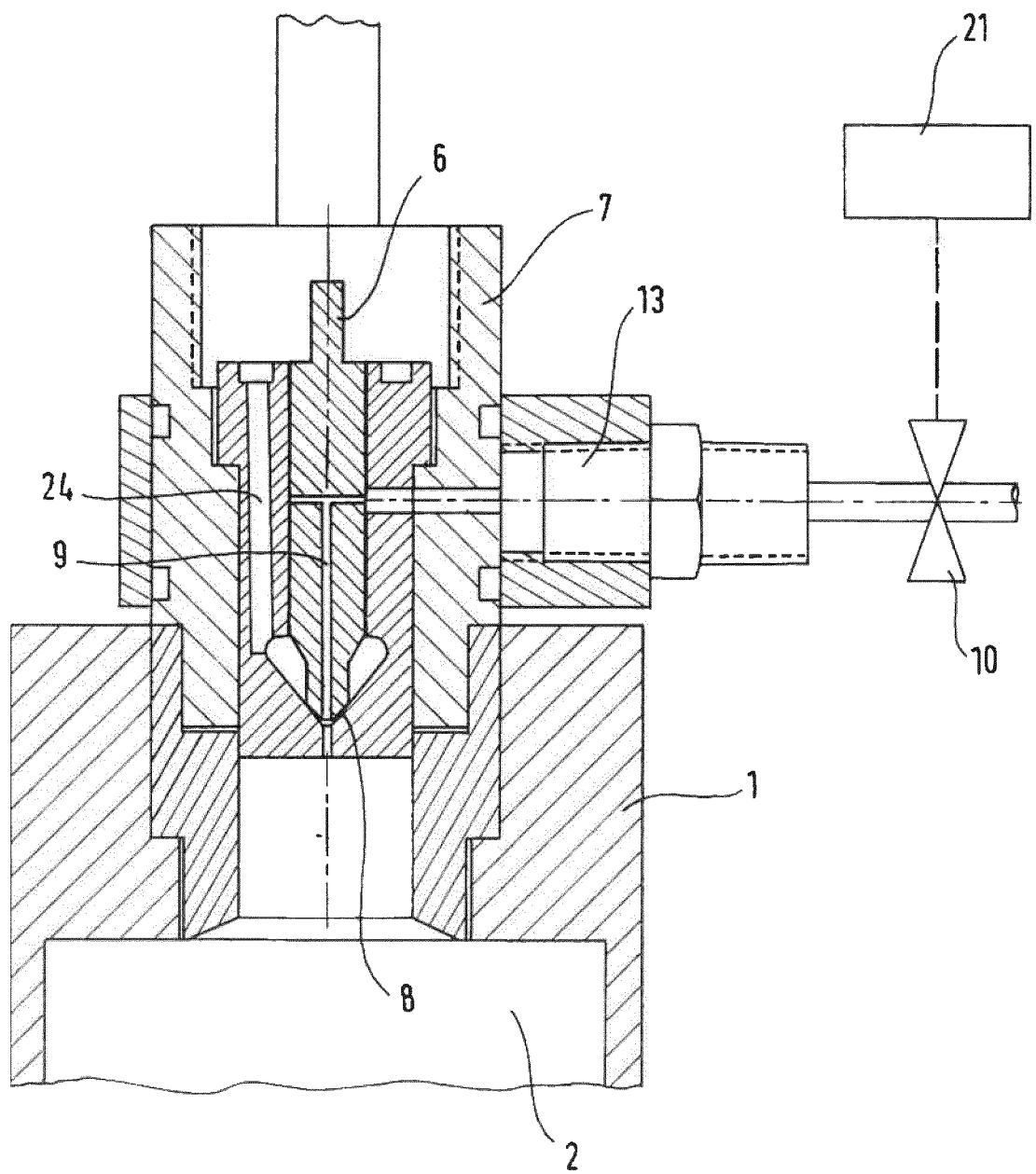
FIG. 3 shows a sectional view through an injection nozzle designed as a throttle pin nozzle on the cylinder head, with a supply line for a medium which promotes combustion in the cylinder.

This can be seen from the detailed drawing according to FIG. 3. FIG. 3 shows a schematic representation as a sectional view of an injection nozzle 7 in a cylinder head 1 of a cylinder 2, with a nozzle needle 6 in its interior in the conventional, known construction. The injection nozzle 7 is designed as a throttle pin nozzle and therefore has only a single sealing seat 8 and a single injection orifice. The advantage of such throttle pin nozzles is that a certain degree of self-cleaning during the combustion process in the cylinder 2 is possible due to there only being one injection orifice. This sealing seat 8 is arranged at the lower point region of the nozzle needle 6. In the interior of the nozzle needle 6, a medium channel 9 is provided via which the combustion-promoting medium is introduced into the cylinder 2. This bore is arranged in the longitudinal direction, and expediently coincides with the longitudinal axis of the nozzle needle 6. In addition, this nozzle needle 6 has radially extending bores which are connected to a supply line in accordance with position, wherein the cross-section width of the supply line for the medium as taken in the longitudinal direction of the nozzle needle 6 is large enough that the medium is applied to the radial bores of the nozzle needle 6 in its stroke region. In order to ensure an improved supply of the medium, a distributor groove, which is not shown separately in the figure, which runs peripherally, is provided on the nozzle needle 6 and/or on the injection nozzle 7. This corresponds in width to the diameter of the respectively assigned supply bore. This groove is configured on the outer diameter of the nozzle needle 6 and/or on the inner diameter of the injection nozzle 7, which serves to receive the nozzle needle 6. The medium is supplied via a medium line 13 via a connection plug to the nozzle needle 6 in the interior of the injection nozzle 7. In the medium line 13 there is, between the pressure vessel for the medium (not shown in FIG. 3), a valve 10, whose closing and opening operation is controlled by a control device 21 according to engine parameters such as operating characteristics, performance, cold start behavior, and emission behavior. Inside the injection nozzle 7, there is a fuel line 24, by means of which the fuel is conveyed into the injection nozzle 7 and thus into the lower region of the nozzle needle 6. With appropriate application, this fuel is conveyed into the region of the nozzle which has a frusto-conical seat 8, by means of which by nozzle needle 6 is lifted off the same by the fuel pressure by the effect of its resulting compressive forces in the direction of the longitudinal axis.

Figure 4:
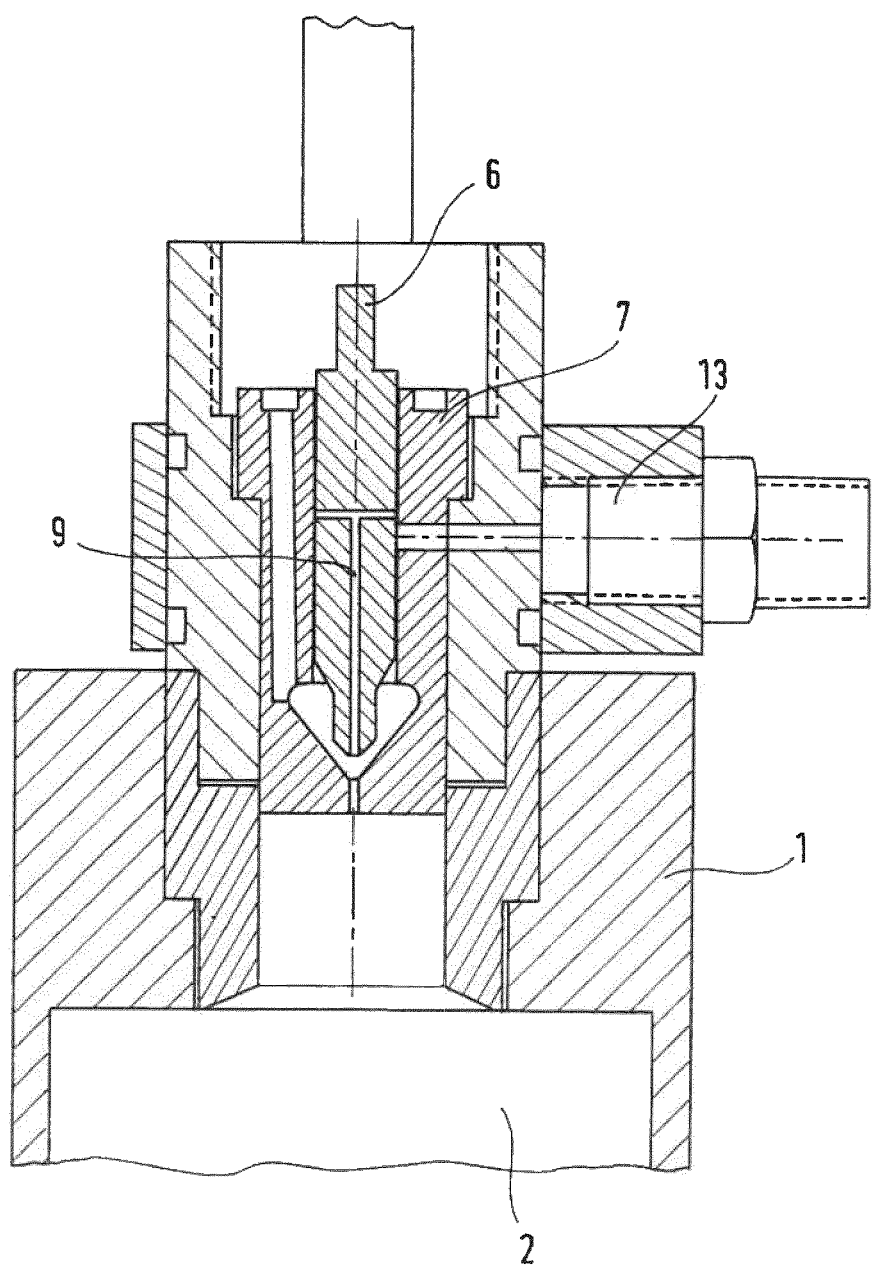
FIG. 4 shows a view according to FIG. 3, but with an open sealing seat of the nozzle needle in the lifted position thereof.

The lifted state of the nozzle needle 6, in which the sealing seat 8 is opened at the tip of the nozzle needle 6, is shown in FIG. 4. The other components correspond to those in FIG. 3, such that they will not be explained again in more detail.

For better understanding, two basic types of injection nozzles are shown in enlarged view in FIG. 5 and FIG. 6—namely a throttle pin nozzle according to FIG. 5, as has already been described in connection with FIGS. 3 and 4, and a blind hole nozzle according to FIG. 6, which also is used in an arrangement according to FIG. 3 or FIG. 4 in the injection nozzle 7.

Figure 5:
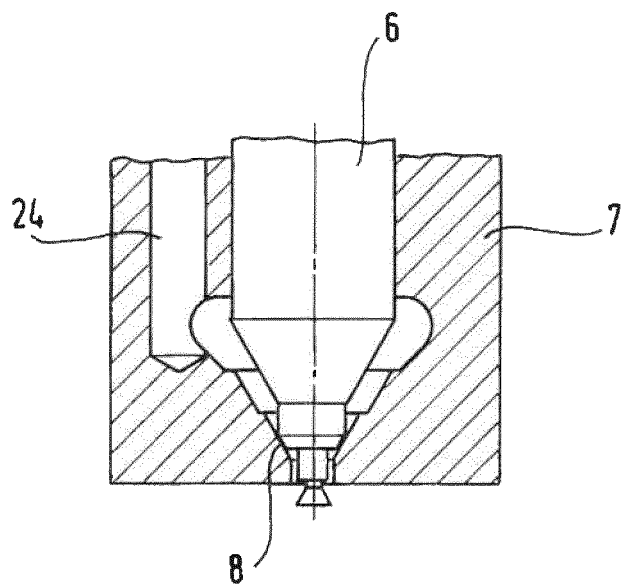
FIG. 5 shows an enlarged detail view of a throttle pin nozzle as an injection nozzle.
Figure 6:
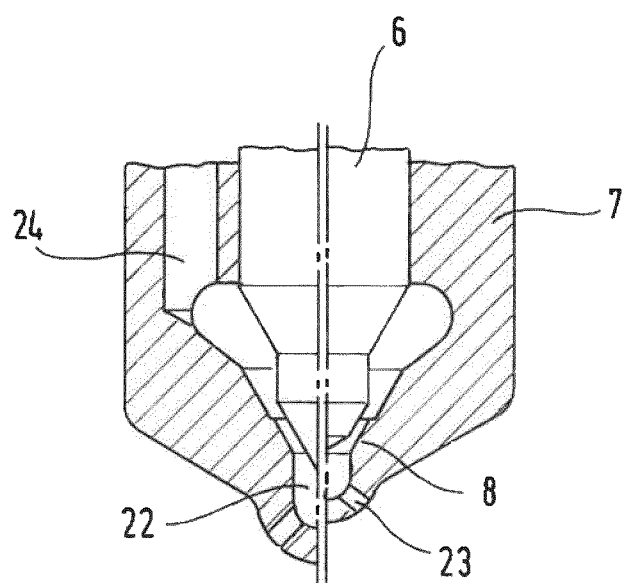
FIG. 6 shows a blind hole nozzle as an injection nozzle, with larger (left) and smaller blind hole (right).

According to FIG. 5, the nozzle needle 6 is guided to the sealing seat 8 by a pin tip with its sealing area, such that, due to the pressing force of the fuel acting on the nozzle needle 6, the nozzle needle lifts off of the sealing seat 8 and fuel is supplied through the fuel line 24 into the lower region of the nozzle needle 6. The lower region is frusto-conical and is subjected to a force acting in the direction of the longitudinal axis of the nozzle needle 6 when fuel pressure is present and/or prevailing. The fuel pressure must at this point be high enough that the resulting force acting on the nozzle needle 6 is sufficiently large to lift it off of its seat in the injection nozzle 7.

In its basic function, the blind hole nozzle does not differ from the throttle pin nozzle, except that below the sealing seat 8 of the nozzle needle 6 in the injection nozzles 7, a blind hole 22 is formed, which realizes, after the lifting of the nozzle needle 6 due to the presence of fuel, a release of the sealing seat 8 such that, under these circumstances, pressurized fuel conveyed from the fuel line 24 into the blind hole 22 is conveyed in the radial injection bores 23 to the cylinder 2 and introduced there in atomized form. The combustion-promoting medium can then be supplied through the inner bore 9, which is not shown in FIGS. 5 and 6, via the controllable valve 10.

Depending on various engine parameters, the control of the release of the sealing seat 8 can be such that at defined times the fuel and the medium can be injected and/or introduced into the cylinder 2.

The invention claimed is:

1. A method for introducing an additional medium which promotes combustion in the cylinder of a reciprocating piston-type internal combustion engine into the cylinder of a piston-type engine, wherein the cylinder head has an injection nozzle with a nozzle needle, and wherein the medium is supplied via the injection nozzle of the piston-type engine,
characterized in that
the additional medium is a combustion air/fuel mixture which is taken from a pressure accumulator and introduced into the cylinder via the injection nozzle which supplies the fuel.

2. The method according to claim 1, characterized in that the medium is supplied at least partially at the same time as the fuel is supplied to the cylinder.

3. The method according to claim 1, characterized in that the medium is supplied by valve control, independently of the lifting movement of the nozzle needle of the injection nozzle.

4. The method according to any one of the claim 1, characterized in that the additional medium is introduced during the fuel injection by lift control.

* * * * *